United States Patent [19]
Kuroiwa

[11] Patent Number: 6,082,964
[45] Date of Patent: Jul. 4, 2000

[54] CENTRIFUGAL PUMP HAVING A FLOATING SEAL RING

[75] Inventor: So Kuroiwa, Kanagawa-ken, Japan

[73] Assignee: Ebara Corporation, Tokyo, Japan

[21] Appl. No.: 09/161,826

[22] Filed: Sep. 29, 1998

[30] Foreign Application Priority Data

Sep. 30, 1997 [JP] Japan .................................... 9-266200

[51] Int. Cl.$^7$ ................................................. F04D 29/16
[52] U.S. Cl. ........................ 415/172.1; 415/113; 415/230; 415/231
[58] Field of Search ............................... 415/172.1, 229, 415/230, 113, 110, 111; 277/411, 421, 422

[56] References Cited

U.S. PATENT DOCUMENTS

| | | |
|---|---|---|
| 3,779,667 | 12/1973 | Johnson . |
| 4,083,647 | 4/1978 | Tatkov et al. ............................ 415/113 |
| 4,909,707 | 3/1990 | Wauligman et al. ................. 415/172.1 |
| 4,948,336 | 8/1990 | Mosure . |
| 4,976,444 | 12/1990 | Richards ................................... 277/53 |
| 5,006,043 | 4/1991 | Katsumata et al. ..................... 415/113 |
| 5,518,256 | 5/1996 | Gaffal ...................................... 277/173 |

FOREIGN PATENT DOCUMENTS

| | | |
|---|---|---|
| 0 039 435 | 11/1981 | European Pat. Off. . |
| 0 167 837 | 1/1986 | European Pat. Off. . |
| 0 492 603 A2 | 7/1992 | European Pat. Off. . |

*Primary Examiner*—Edward K. Look
*Assistant Examiner*—Ninh Nguyen
*Attorney, Agent, or Firm*—Armstrong, Westerman, Hattori, McLeland & Naughton

[57] ABSTRACT

A pump has an impeller, a casing defining a pump chamber around the impeller for receiving a fluid discharged from the impeller; and, a seal mechanism provided between the impeller and the casing to prevent a fluid from leaking from the pump chamber through an annular space formed between the casing and the impeller. The seal mechanism comprises an annular seal member for blocking the annular space leaving an annular gap between the impeller and the seal member. The annular seal member is movably supported so that the annular seal member is supported in a floating condition in the fluid therearound in operation.

6 Claims, 5 Drawing Sheets

CENTRIFUGAL PUMP HAVING A FLOATING SEAL RING

BACKGROUND OF THE INVENTION

This invention relates to a centrifugal pump, specifically, to a seal mechanism provided between an impeller of a pump and a casing defining a pump chamber around the impeller for receiving a fluid discharged from the impeller to prevent fluid from leaking from the pump chamber through a space formed between the casing and the impeller.

FIG. 8 shows such a prior art seal mechanism including an annular seal member 10 fixedly provided on a casing 14 for defining a pump chamber 16 around an impeller 12 for receiving fluid discharged from the impeller in such a manner that the annular seal member 10 blocks an annular space 18 formed between the casing and the impeller leaving an annular small gap 20.

In the seal mechanism, it is necessary for the annular gap 20 between the seal member 10 and the impeller 12 to be maintained appropriately. If the gap is large, an undesirable amount fluid leakage from the pump chamber will occur. To the contrary, if the gap is too small, the impeller is liable to contact with the seal member, thereby causing problems such as overload and noise. However, it is difficult for the annular seal member to be positioned properly relative to the impeller 12 which cooperates with the seal member to define the gap 20 and further it is difficult for the gap to be maintained appropriately as the size of the gap readily varies due to changes in the relative position between the casing and the impeller or a displacement of those elements.

SUMMARY OF THE INVENTION

An object of this invention is therefore to provide a pump in which a gap between an impeller and a seal member provided around the impeller is maintained properly.

According to this invention, a pump is provided which includes an impeller, a casing defining a pump chamber around the impeller for receiving a fluid discharged from the impeller; and, a seal mechanism provided between the impeller and the casing to prevent a fluid from leaking from the pump chamber through an annular space formed between the casing and the impeller, the seal mechanism comprising an annular seal member for blocking the annular space leaving an annular gap between the impeller and the seal member, the annular seal member being supported in such a manner that the annular seal member is movable in a radial direction.

The annular seal member may be movably supported so that the annular seal member is supported in a floating condition in the fluid therearound in operation.

Specifically, the seal mechanism comprises a support member provided on the casing for movably supporting the annular seal member. The support member includes a radially outer portion provided radially outside of the annular seal member to limit the movement of the annular seal member in a radial direction and first and second radially inner portions provided radially inside of the radially outer portion at the opposite sides of the annular seal member to limit the movement of the annular seal member in an axial direction.

The radially outer portion may be annular and have an inner diameter larger than the outer diameter of the annular seal member and the first and second radially inner portions may be annular and have inner diameters smaller than the outer diameter of said annular seal member.

The first radially inner portion may include at least one projection projecting therefrom toward the second radially inner portion and the annular seal member may include at least one recess adapted to receive the projection thereinto. The recess is adapted to limit the movement of said annular seal member about the axis thereof by engagement of the radially extending side walls of the recess with the pin.

The projection may formed from a portion of the first radially inner portion which is bent towards the recess.

The projection may be a discrete member and fixedly connected to the first radially inner portion.

The radially outer portion and the second radially inner portions may be integrally formed and the first radially inner portion may be prepared separately from and connected to the integrally formed radially outer portion and the second radially inner portion.

BRIEF DESCRIPTION OF THE INVENTION

Figure 2:
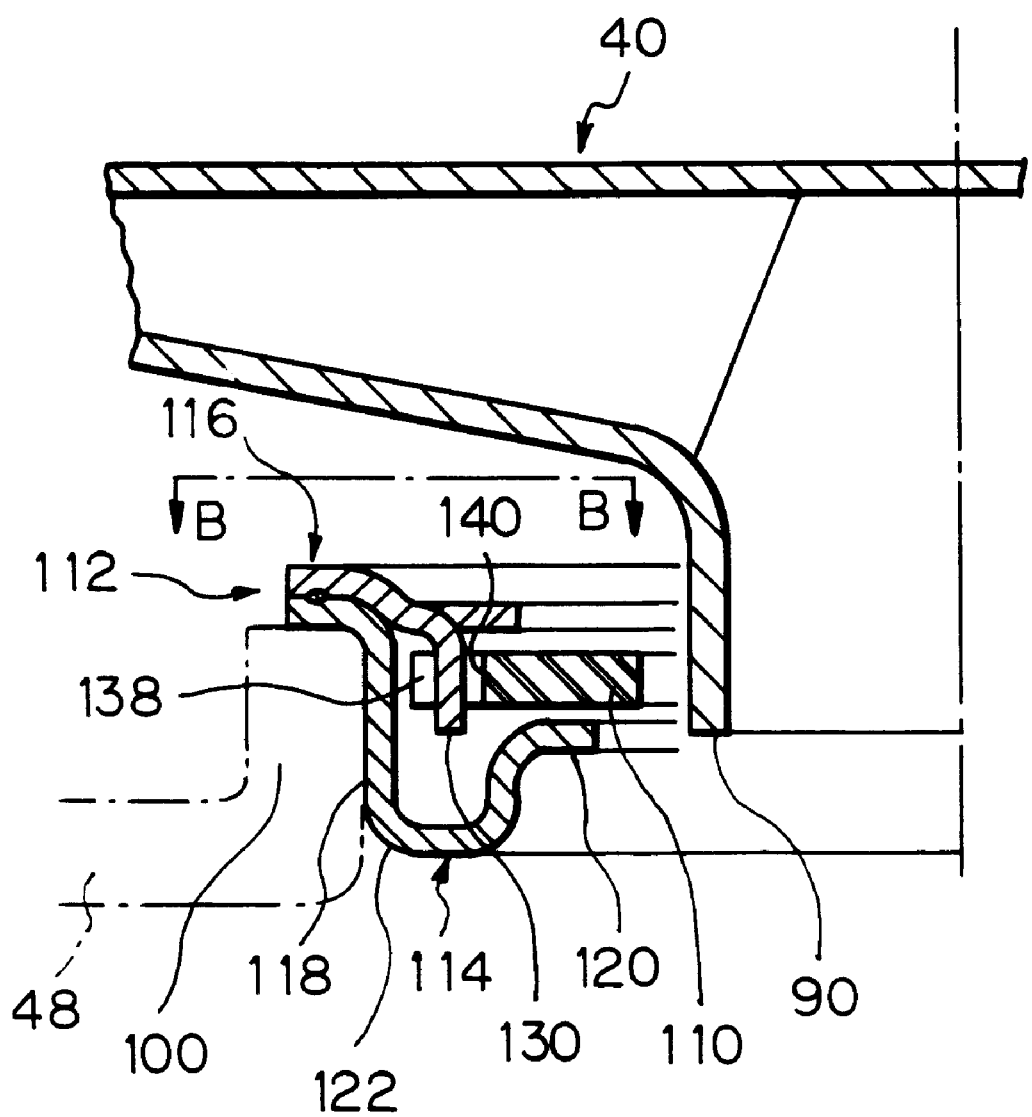
FIG. 2 is an enlarged view of a portion in a circle A in FIG. 1 showing a relationship between a seal mechanism of this invention and an impeller.
Figure 3:
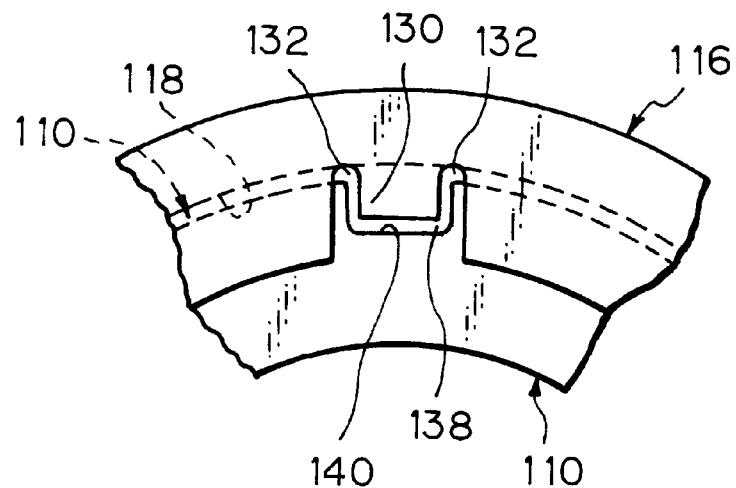
Figure 4:
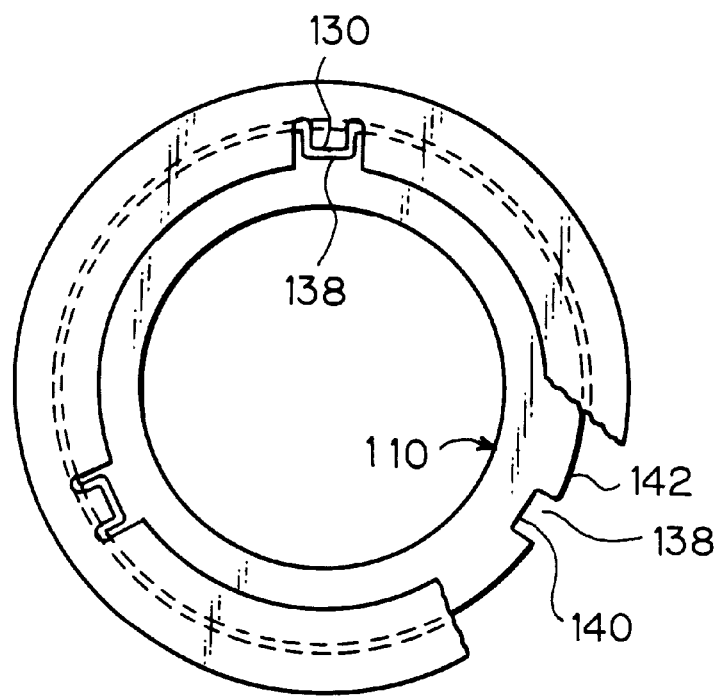
Figure 5:
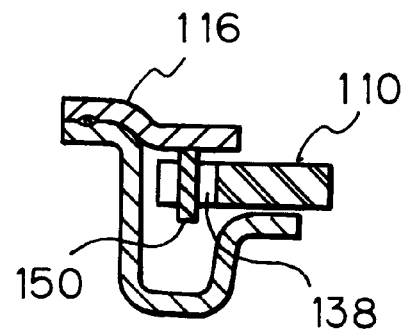
Figure 6:
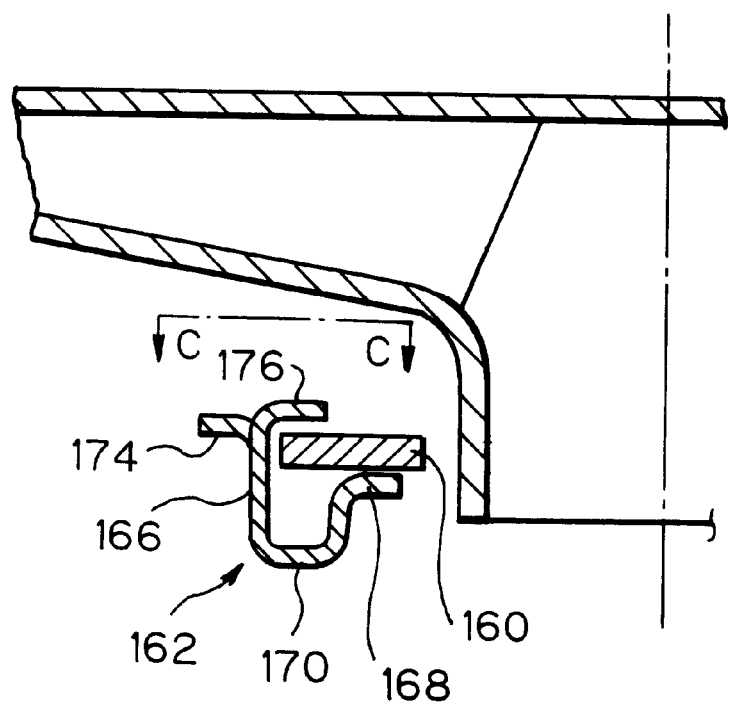
Figure 7:
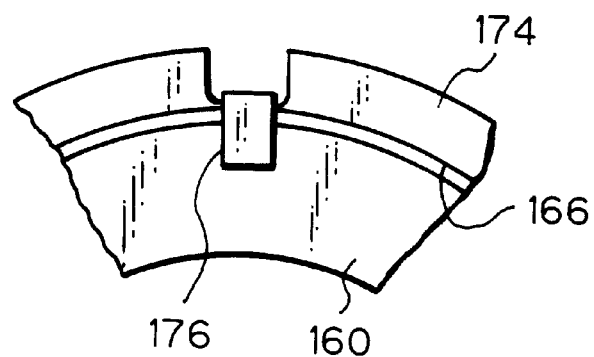
Figure 8:
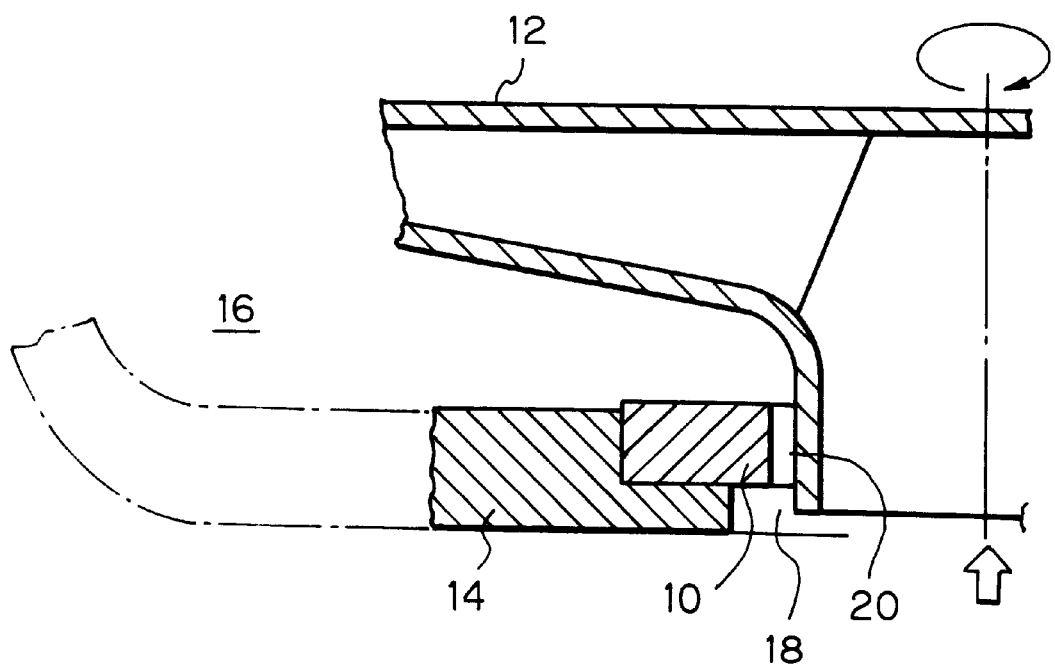

FIG. 3 a view taken along a line B—B in FIG. 2,

FIG. 4 is a plan view of the seal mechanism;

FIG. 5 is a cross sectional side elevation view of a part of a seal mechanism of a second embodiment showing a relationship between a seal member and a support member of the seal mechanism;

FIG. 6 is a view similar to FIG. 2 showing a seal mechanism of a third embodiment;

FIG. 7 is a view taken along a line C—C in FIG. 6; and,

FIG. 8 is a cross-sectional side elevation view of a prior art seal mechanism.

DETAILED DESCRIPTION OF PREFERRED EMBODIMENTS

The invention will be explained with reference to the attached drawings.

FIGS. 1–4 show a centrifugal pump 30 in accordance with the first embodiment of the invention.

Figure 1:
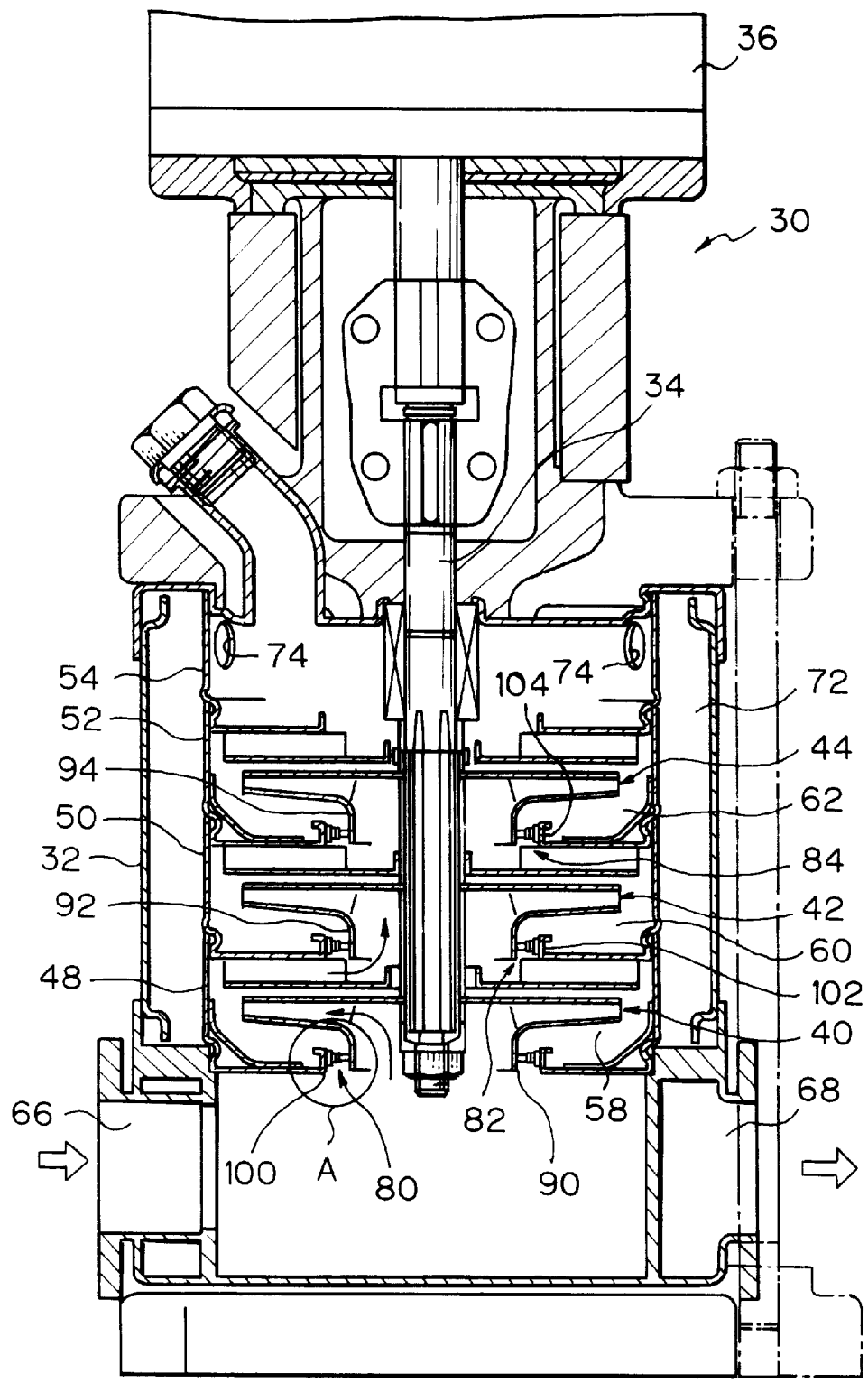
FIG. 1 is a cross sectional side elevational view of a centrifugal pump in accordance with this invention.

As shown in FIG. 1, the pump 30 includes a housing 32, a rotational shaft 34 adapted to be rotated by a motor 36 mounted on the top of the housing 32, first, second and third impellers 40, 42, 44 fixedly mounted on the shaft 34 and first, second, third and fourth casings 48, 50, 52, 54 stationarily provided in the housing 32 to define first, second and third pump chambers 58, 60, 62.

The housing includes a fluid inlet 66 and a fluid outlet 68 so that fluid is supplied from the inlet 66, forcibly moved through the first, second and third pump chambers 58, 60, 62 by the impellers rotated by the motor so that the pressure of the fluid is boosted, led into a chamber 72 formed between the housing 32 and the casings 48, 50, 52, 54 through openings 74 formed in the fourth casing and discharged from the outlet 68.

The pump further includes seal mechanisms 80, 82, 84 provided between each of inlet portions 90, 92, 94 of the impellers 40, 42, 44 and a corresponding one of inner edges 100, 102, 104 of radial walls of the first, second and third casings 48, 50, 52.

As shown in FIGS. 2–4, each of the seal mechanism includes an annular seal member 110 provided around the inlet portion of the impeller and a support member 112 supporting the seal member.

The support member 112 comprises first and second annular members 114, 116 fixedly connected to each other. The first member 114 has a radially outer annular portion 118 extending in parallel with the axis of the impeller, a radially inner portion 120 extending normal to the axis of the impeller and an intermediate U-shaped portion 122 connecting the portions 118 and 120. The second annular member 116 is connected to the first annular member 114 along the annular flange formed along an annular edge of the radially outer portion 118 and extends generally normal to and towards the axis of the impeller. The second annular member 116 has three bends 130 which are, as shown in FIG. 4, equally separated from each other in the circumferential direction. Each of the bends 130 is formed from a portion in the second annular member defined by a pair of slits formed on the opposite sides thereof and extending from the inner circular edge of the second annular member toward the outer circular edge of the same and bent toward the intermediate U-shaped portion 122 of the first annular member.

The annular seal member 110 has an inner diameter which is larger than the outer diameter of the fluid inlet portion of the impeller and an outer diameter which is smaller than the inner diameter of the radially outer portion 118 of the first annular member 114. The seal member 110 further has three notches 138 provided in the outer circular edge 130 of the seal member in such a manner that the notches 138 are equally separated from each other in the circumferential direction to receive corresponding one of the bends 130 of the annular support member 112. The depth of the notch 138 is designed such that when the seal member 110 is moved radially outwardly, the bottom edge 140 of the notch 138 does engage with the bend 130 and, instead, the outer circular edge 142 of the seal member engages with the radially outer portion 118 of the support member. The width of the notches is designed such that the bend 130 in the notch is allowed to freely move in the radial direction. The bend 130 limits the rotational movement of the seal member.

In operation, the seal members 110 are in a floating condition in the fluid around the rotating shaft 34 and the gap between the seal member 110 and the fluid inlet portion 90 of the impeller is appropriately maintained in the fluid.

FIG. 5 shows another embodiment of the seal mechanism which is substantially equal to that of the first embodiment noted above except that the bend is replaced by a projection 150 formed from a pin fixedly connected to the second annular member.

FIGS. 6 and 7 show a seal mechanism according to the other embodiment. The seal mechanism includes an annular seal member 160 and an annular support member 162. The seal member 160 is different from that of the first embodiment in that the seal member has no notch as designated by 138 in FIGS. 3 and 4. Correspondingly, the support member 162 has neither a bend as designated by 130 in FIGS. 3 and 4 nor a projection as designated by 150 in FIG. 5. The annular support member 162 is formed from one piece and includes a radially outer portion 166, a radially inner portion 168 and an intermediate U-shaped portion 170. The radially outer portion 166 is provided with an annular flange 174 along the upper edge thereof (as viewed in FIG. 7) adapted to be fixedly connected to a pump chamber casing (not shown). The flange 174 has a plurality of bends 176 each of which is formed from a portion in the flange defined a pair of slits formed on the opposite sides thereof and extending from the outer circular edge of the flange 174 and extending toward the inner circular edge of the same and bent toward the axis of the annular support member to extend generally normal to the axis over the outer circular edge portion of the seal member 160. The outer diameter of the seal member 160 is smaller than the inner diameter of the radially outer portion 166 so that the seal member is allowed to radailly moved relative to the annular support member 162. The bend 176 is spaced from the radially inner portion in the axial direction in such a manner that a limited axial movement of the seal member is allowed.

What is claimed is:

1. A pump including:
   an impeller;
   a casing defining a pump chamber around said impeller for receiving a fluid discharged from said impeller; and
   a seal mechanism provided between said impeller and said casing to prevent a fluid from leaking from said pump chamber through an annular space formed between said casing and said impeller, said seal mechanism comprising:
      an annular seal member for blocking said annular space leaving an annular gap between said impeller and said seal member and
      a support member provided on said casing for movably supporting said annular seal member, said support member including
         a radially outer portion provided radially outside of said annular seal member to limit the movement of said annular seal member in a radial direction, and,
         first and second radially inner portions provided radially inside of said radially outer portion at the opposite side of said annular seal member to limit the movement of said annular seal member in an axial direction,
         wherein said radially outer portion is annular and has an inner diameter larger than the outer diameter of said annular seal member and said first and second radially inner portions are annular and have inner diameters smaller than the outer diameter of said annular seal member,
         said first radially inner portion includes at least one projection projecting therefrom toward said second radially inner portion, and
         said annular seal member includes at least one recess being adapted to limit the movement of said annular seal member about the axis thereof by engagement of the radially extending side walls of the recess with said projection.

2. A pump as set forth in claim 1 wherein said projection is formed from a portion of said first radially inner portion which is bent towards said recess.

3. A pump as set forth in claim 1 wherein said projection is a discrete member and fixedly connected to said first radially inner portion.

4. A pump as set forth in any one of claims 1 and 2 wherein said radially outer portion and said second radially inner portion are integrally formed and said first radially inner portion is prepared separately from and connected to said integrally formed radially outer portion and said second radially inner portion.

5. A pump comprising:
   an impeller;
   a casing defining a pump chamber around said impeller for receiving a fluid discharged from said impeller; and
   a seal mechanism provided between said impeller and said casing to prevent a fluid from leaking from said pump chamber through an annular space formed between said casing and said impeller, said seal mechanism comprising:

an annular seal member for blocking said annular space leaving an annular gap between said impeller and said seal member and a support member provided on said casing for movably supporting said annular seal member, said support member including a radially outer portion provided radially outside of said annular seal member to limit the movement of said annular seal member in a radial direction, and, first and second radially inner portions provided radially inside of said radially outer portion at the opposite side of said annular seal member to limit the movement of said annular seal member in an axial direction, wherein said radially outer portion and said second radially inner portion are integrally formed and said first radially inner portion is prepared separately from and connected to said integrally formed radially outer portion and said second radially inner portion.

6. A pump comprising:

an impeller;

a casing defining a pump chamber around said impeller for receiving a fluid discharged from said impeller; and a seal mechanism provided between said impeller and said casing to prevent a fluid from leaking from said pump chamber through an annular space formed between said casing and said impeller, said seal mechanism comprising:

an annular seal member for blocking said annular space leaving an annular gap between said impeller and said seal member and a support member provided on said casing for movably supporting said annular seal member, said support member including a radially outer portion provided radially outside of said annular seal member to limit the movement of said annular seal member in a radial direction, and, first and second radially inner portions provided radially inside of said radially outer portion at the opposite side of said annular seal member to limit the movement of said annular seal member in an axial direction, wherein said radially outer portion is annular and has an inner diameter larger than the outer diameter of said annular seal member and said first and second radially inner portions are annular and have inner diameters smaller than the outer diameter of said annular seal member, and said radially outer portion and said second radially inner portion are integrally formed and said first radially inner portion is prepared separately from and connected to said integrally formed radially outer portion and said second radially inner portion.

* * * * *